United States Patent [19]

Saito et al.

[11] Patent Number: 5,043,114
[45] Date of Patent: Aug. 27, 1991

[54] MOLDING METHOD FOR MANUFACTURING EXPANSION-MOLDED INSERT-EMBEDDED RESIN PRODUCT

[75] Inventors: Mitsuo Saito; Kanichi Takahashi; Junichi Kurihara, all of Utsunomiya, Japan

[73] Assignee: Honda Giken Kogyo Kabushiki Kaisha, Tokyo, Japan

[21] Appl. No.: 449,454

[22] Filed: Dec. 12, 1989

Related U.S. Application Data

[63] Continuation of Ser. No. 266,754, Nov. 3, 1988, abandoned.

[30] Foreign Application Priority Data

Nov. 4, 1987 [JP] Japan .................. 62-277373
Nov. 27, 1987 [JP] Japan .................. 62-297661

[51] Int. Cl.$^5$ .............................................. B29C 67/22
[52] U.S. Cl. ................................ 264/46.6; 264/46.7; 264/154; 264/255; 264/271.1
[58] Field of Search ............ 264/46.4, 46.6, 154, 264/46.7, 46.8, 271.1, 279.1, 255

[56] References Cited

U.S. PATENT DOCUMENTS

| 2,845,997 | 8/1958 | Waite | 155/179 |
| 3,534,129 | 10/1970 | Bartel | 264/45.1 |
| 4,116,736 | 9/1978 | Sanson et al. | 264/46.6 |
| 4,134,942 | 1/1979 | Mirr et al. | 264/46.6 |
| 4,278,629 | 7/1981 | Bennett | 264/46.6 |
| 4,377,609 | 3/1983 | Bartoli et al. | 264/46.6 |
| 4,420,447 | 12/1983 | Nakashima | 264/46.7 |
| 4,544,126 | 10/1985 | Melchert | 264/46.4 |

FOREIGN PATENT DOCUMENTS

| 3532518A1 | 3/1987 | Fed. Rep. of Germany . |
| 2394396 | 1/1979 | France . |
| 1309445 | 3/1973 | United Kingdom . |

Primary Examiner—Robert A. Dawson
Assistant Examiner—Allan R. Kuhns
Attorney, Agent, or Firm—Armstrong, Nikaido, Marmelstein, Kubovcik & Murray

[57] ABSTRACT

A molding method in which a first expansion-molded layer is formed inside of the skin molded in the shape corresponding to the configuration of a molded product, an insert member is placed in a location inside of the first expansion-molded layer and, in this condition, a second expansion-molded layer is formed inside of the first expansion-molded layer so that the insert member may be embedded in the second expansion-molded layer.

8 Claims, 2 Drawing Sheets

MOLDING METHOD FOR MANUFACTURING EXPANSION-MOLDED INSERT-EMBEDDED RESIN PRODUCT

This application is a continuation-in-part of application Ser. No. 266,754 filed Nov. 3, 1988, now abandoned.

This invention relates to a molding method for manufacturing an expansion-molded resin product such as an automobile instrument panel having an insert member embedded in its expansion-molded layer.

In a conventional method for manufacturing this kind of molded product, it has been usual that an expansion molding is performed while an insert member is kept set in place in a mold so that a molded product having a predetermined shape of the exterior surface can be obtained by a single molding operation.

In the foregoing conventional method, when the resin is formed in a mold, the flow of foaming resin is hampered by the insert member in the mold resulting in defective foaming of the resin. There is often formed an uneven or unsmooth skin on the molded product due to such defective foaming of the resin. This could cause the precision of the process with respect to configuration of the product to become poor. While such an adverse effect to the exterior shape of the product may be avoided by changing the shape of the insert member, such a measure results in limited design choice of the insert member.

OBJECT AND SUMMARY OF THE INVENTION

It is therefore, the object of the present invention to provide a molding method by which a molded product can be produced having a good configurative precision irrespective of the shape of the insert member, thus solving the foregoing problem.

To achieve the above object, this invention provides a molding method in which a first expansion-molded layer is formed inside of the skin molded in the shape corresponding to the configuration of a molded product, an insert member is placed in a location in an inner space defined by the first expansion-molded layer and, in this condition, a second expansion-molded layer is formed inside of the first expansion-molded layer so that the insert member may be embedded in the second expansion-molded layer.

Since there is not present an insert member which can obstruct the flow of foaming resin when the first expansion-molded layer is being formed, good and uniform foaming of resin takes place throughout the layer to provide a skin free of unevenness that could result from a defective foaming. In this manner, the first expansion-molded layer can be obtained integrally formed with the skin featuring a favorable configurative precision.

Although there can sometimes occur a partially unsatisfactory foaming of resin due to presence of the insert member when the second expansion-molded layer is being formed, it does not affect the exterior shape of the molded product, so that the insert member can be designed in desired shapes without fearing its possible adverse effect on the exterior shape or configuration of the molded product. This widens the range of design choice of the insert member.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
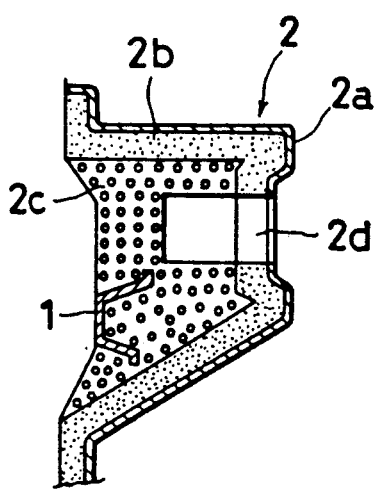
FIG. 1 is a sectional view of an instrument panel formed according to one embodiment of the present invention.

One embodiment of this invention in which it is applied to molding of an instrument panel 2 for an automobile is shown in FIGS. 1-5. The panel has an insert member 1 consisting of a bracket for mounting the final product on a vehicle body as shown in FIG. 1. The formation of the panel will now be explained with reference to FIGS. 2 through 5 of the accompanying drawings.

Figure 2:
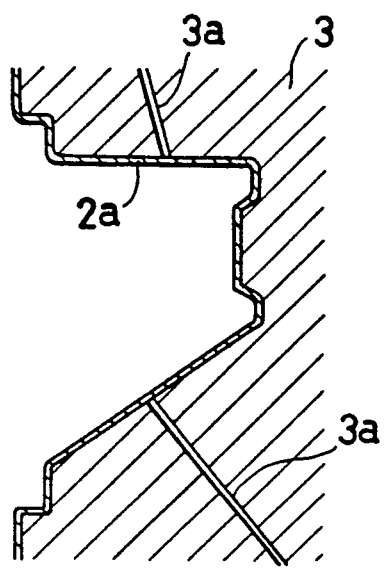
FIGS. 2 through 5 show molding steps to form the same.
Figure 3:
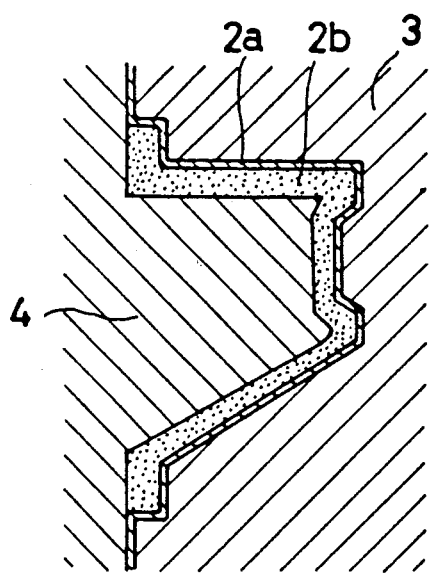
Figure 4:
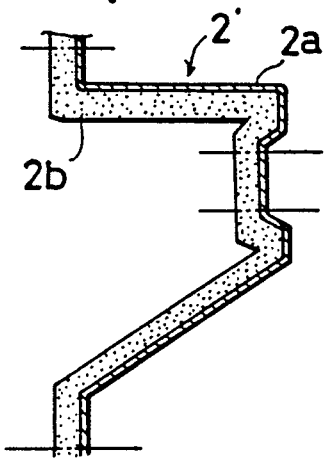

In the drawings, a first die 3 and a first punch 4 are provided for the first expansion molding while a second die 5 and a second punch 6 are provided for the second expansion molding. As shown in FIG. 2, an outer skin 2a is set in the die 3 and, using vacuum pipes 3a, the skin 2a is vacuum-formed into the shape corresponding to the configuration of the instrument panel 2. Then the punch 4 is clamped therewith. Now, as shown in FIG. 3, foam resin liquid of urethane or the like is injected into a cavity of a practically uniform width formed between the skin 2a and the punch 4 for an expansion molding, foamed and then cured therein. This forms an intermediate molded panel material 2' which is the product of the first expansion molding and has a first expansion-molded layer 2b formed inside of the skin 2a. In this case, there is no insert member 1 or the like present in the cavity which can make an obstacle to a smooth foaming, so that a satisfactory foaming is carried out throughout the cavity to provide the intermediate molded panel material 2' featuring a high configurative precision.

According to this embodiment, since the first expansion-molded layer 2b is formed to have a practically uniform thickness throughout, such drawbacks adversely affecting the appearance of the product as sinks that result from difference in the curing time of various parts of the panel material 2' can be prevented from occurring. This further contributes to improvement of the configurative precision of the product. The intermediate molded panel material 2' is then trimmed along the trimming lines indicated by chain lines shown in FIG. 4.

Figure 5:
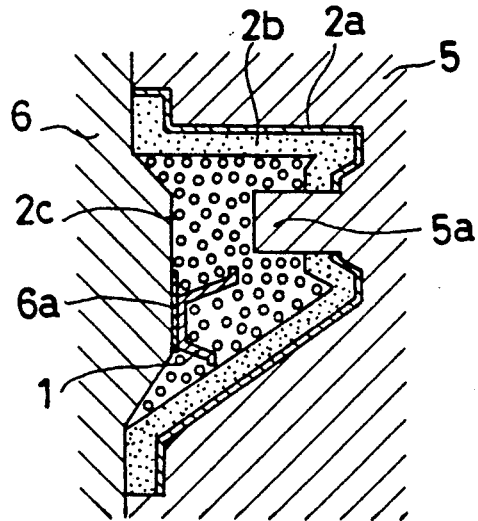

Next, the intermediate molded panel material 2' is put and set in the second expansion molding die 5 in such a manner that a through hole formed in the front side thereof through the trimming process may have a projection 5a protruding from the bottom of the die 5 fitted thereinto. In this case, if the configurative precision of the molded panel material 2' is poor, it is difficult to set the molded panel material in the die 5 as above. However, the molded panel material 2' formed according to the present invention has such a good configurative precision that it is completely free from such an inconvenience as mentioned in the foregoing. Now, the second expansion molding punch 6 holds the insert member 1 in a desired position such as by attraction of a magnet 6a or suction by a suction disk (not shown) provided therein. In this condition, the punch 6 is clamped to the die 5. Then, as shown in FIG. 5, foam resin liquid is injected into a cavity which is formed between the first expansion-molded layer 2b and the second punch 6 and located inside of the first expansion-molded layer 2b so that it may be foamed and cured therein. According to this embodiment of the present invention, there can be thus obtained, as shown in FIG. 1, an instrument panel 2 which is constructed of three layers including the skin 2a, the first expansion-molded layer 2b and the second expansion-molded layer 2c having the insert member 1 embedded therein, and which is provided with an open recess 2d for receiving an accessory therein, the recess being formed according to the aforementioned projection 5a on the second die 5.

Although it is possible that the second expansion-molded layer may have partially unsatisfactory foaming due to presence of the insert member 1 therein, such a defective or unsatisfactory foaming, if any, takes place only in a portion having little to do with the appearance of the instrument panel 2, so that it can be corrected or mended easily.

In the foregoing embodiment of the present invention in which forming of the second expansion-molded layer 2c is carried out while the insert member 1 is kept attracted to the punch 6 by means of the magnet 6a or the suction disk (not shown), there is a possibility that the insert member 1 may be caused to move out of position due to the resin injection pressure and/or foaming pressure especially when the insert member 1 is large-sized. Another embodiment of the present invention materialized to prevent this kind of displacement of the insert member 1 and thus have the same embedded correctly in a predetermined position is explained in the following with reference to FIG. 6 and those that follow. The same reference numerals are used to denote identical parts in the second embodiment.

Figure 6:
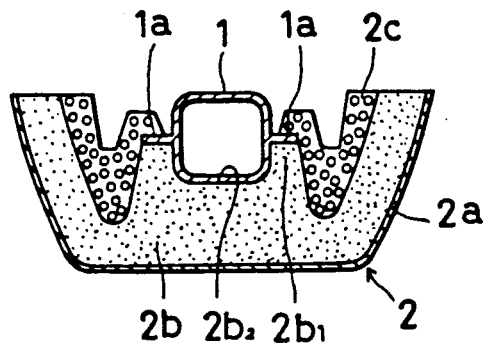
FIG. 6 is a sectional view of an instrument panel formed according to another embodiment of the present invention.

This embodiment relates to an instrument panel 2 in which the insert member is an air duct 1 for air conditioning embedded in the panel as shown in FIG. 6. In the drawings, a single female mold die 7 is commonly used for the first and the second expansion moldings. A first punch 8 is the male portion of the mold for the first expansion molding, and a second punch 9 is the male portion of the mold for the second expansion molding.

Figure 7:
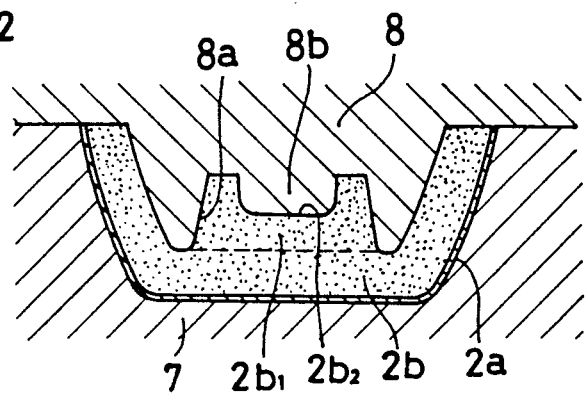
FIGS. 7 through 9 show molding steps to form the same.

First, as in the first embodiment described in the foregoing, the skin 2a is formed through a vacuum forming process using the die 7 and thereafter the first punch 8 for the first expansion molding is clamped thereto. Foam resin liquid is then injected into a cavity formed between the skin 2a and the first punch 8, foamed, and cured so as to form the first expansion-molded layer 2b as shown in FIG. 7.

A suitable number of recessed portions 8a are formed at intervals on the first punch 8 along the longitudinal direction thereof (that is, the direction perpendicular to the sheet surface of the drawings). There is provided on the bottom of the recessed portions 8a a small projection 8b so formed as to coincide with the section shape of the lower half of the air duct 1. Because of this arrangement, the first expansion-molded layer 2b has protrusions $2b_1$ formed and arranged at intervals in the longitudinal direction thereof with each of the protrusions $2b_1$ positioned to correspond to each of the recessed portions 8a. Each of the protrusions $2b_1$ has on the upper end surface thereof a recessed portion $2b_2$ formed to correspond to the small projection 8b. The protrusions $2b_1$ are formed to take up only a smaller portion of the first expansion-molded layer 2b while the larger general portion thereof is formed to have a uniform thickness as indicated by the dotted line on FIG. 7, so that the configurative precision of the molded product should not be deteriorated.

Figure 8:
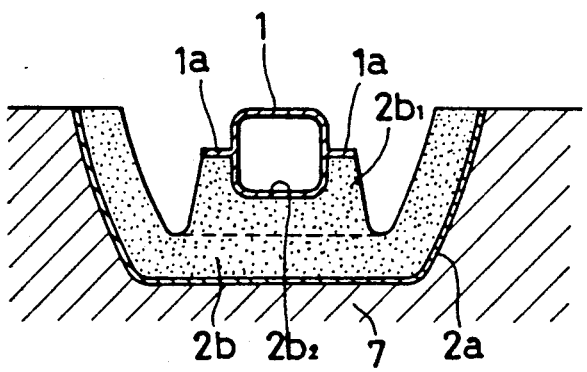
Figure 9:
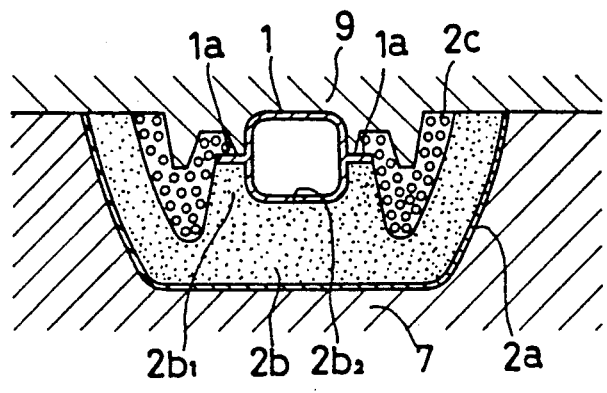

Next, after removing the first punch 8, the air duct or insert 1 is mounted onto the protrusion $2b_1$ in such a manner that the lower half thereof may be received in the recessed portion $2b_2$, as shown in FIG. 8. Here, since the recessed portion $2b_2$ is formed to coincide with the sectional shape of the lower half of the air duct 1, the air duct 1 is set in position in, and supported by, the protrusion $2b_1$ which thus serves as a positioning means for the air duct 1. Then, as shown in FIG. 9, the second punch 9 for the second expansion molding is clamped to the die 7 and foam resin liquid is injected into a cavity formed between the first expansion-molded layer 2b and the second punch 9, foamed, and cured so as to form the second expansion-molded layer 2c. In this embodiment, the upper half of the air duct or insert 1 excluding a flange portion 1a is pressed down from above by the second punch 9, so that the flange portion 1a is embedded in the second expansion-molded layer 2c at a portion of the first expansion-molded layer where the protrusion $2b_1$ is formed while the lower half of the air duct 1 including the flange portion 1a is embedded in the second expansion-molded layer 2c at portions other than where the protrusion $2b_1$ is formed.

As described in the foregoing, by forming a positioning section in the first expansion-molded layer 2b in which an insert member is to be positioned and supported in place, the insert member is prevented from being moved out of position by the resin injection pressure and/or foaming pressure when the second expansion-molded layer 2c is being formed, so that the insert member is embedded correctly at the predetermined position.

As described in the foregoing, according to the present invention, the first expansion-molded layer is formed inside of the skin and the insert member is embedded in the second expansion-molded layer which is formed inside of the first expansion-molded layer and which thus does not affect the exterior shape of the molded product. This enables one to obtain an insert-embedded molded product having a higher configurative precision for the exterior shape of the product. In addition, it further provides a greater range of design choice with respect to shapes of the insert member, all these combining to surely remove the aforementioned inconvenience of the prior art.

It is readily apparent that the above-described has the advantage of wide commercial utility. It should be understood that the specific form of the invention hereinabove described is intended to be representative only, as certain modifications within the scoape of these teaching will be apparent to those skilled in the art.

Accordingly, reference should be made to the following claims in determining the full scope of the invention.

What is claimed is:

1. A molding method for manufacturing an expansion-molded, insert-embedded foamed resin product comprising:
   forming a skin in the shape corresponding to that of a desired exterior surface of the expansion-molded, insert-embedded product;

forming by foaming a first expansion-molded layer inside of the skin to have a substantially uniform thickness, said first expansion-molded layer being formed over at least that entire interior portion of the skin which forms the configuration of a final product of said expansion-molded insert-embedded product and defining a concave inner space;

performing treatments of trimming the edge portions of said first expansion-molded layer having said skin thereon and of providing at a desired location in said first expansion-molded layer having said skin thereon an opening for mounting therein an accessory; and forming by foaming a second expansion-molded layer using a die having a protruded portion which fits into the opening for mounting an accessory and by filling said concave inner space of the first expansion-molded layer and simultaneously embedding an insert member therein while keeping the insert member positioned at a desired location in said concave inner space defined by the first expansion-molded layer, said second expansion-molded layer functioning as a stiffening member for giving rigidity to said expansion-molded, insert-embedded resin product.

2. A molding method for manufacturing an expansion-molded, insert-embedded foamed resin product according to claim 1, wherein said insert member is hollow and has a flange, further comprising embedding only said flange in the second expansion-molded layer.

3. A molding method for manufacturing an expansion-molded, insert-embedded foamed resin product according to claim 1, wherein said expansion-molded, insert-embedded resin product is an instrument panel.

4. A molding method for manufacturing an expansion-molded, insert-embedded foamed resin product comprising:

forming a skin in the shape corresponding to that of a desired exterior surface of the expansion-molded, insert-embedded product;

forming by foaming a first expansion-molded layer inside of the skin to have a substantially uniform thickness at least over that entire interior portion of the skin which forms the configuration of a final product of said expansion-molded insert-embedded product, said first expansion-molded layer having a concave inner space and supporting sections for supporting an insert member in a desired position within the concave inner space;

placing an insert member on said supporting sections; and forming a second expansion-molded layer using a die having a portion pressing said insert member against said supporting sections, and filling said concave inner space defined by the first expansion-molded layer by foaming said second expansion-molded layer and simultaneously embedding at least a portion of said insert member therein while keeping the insert member positioned by said supporting sections, said second expansion-molded layer functioning as a stiffening member for giving rigidity to said expansion-molded, insert-embedded resin product.

5. A molding method for manufacturing an expansion-molded, insert-embedded foamed resin product according to claim 4, wherein said insert-positioning and supporting section is formed to have a recess shaped to coincide with a section shape of a portion of the insert member so that said portion of the insert member may be received in said recess.

6. A molding method for manufacturing an expansion-molded, insert-embedded foamed resin product according to claim 5, wherein said insert member is hollow and has a flange, further comprising embedding only said flange in the second expansion-molded layer.

7. A molding method for manufacturing an expansion-molded, insert-embedded foamed resin product according to claim 4, wherein said insert member is hollow and has a flange, further comprising embedding only said flange in the second expansion-molded layer.

8. A molding method for manufacturing an expansion-molded, insert-embedded foamed resin product according to claim 4, wherein said expansion-molded, insert-embedded resin product is an instrument panel.

* * * * *